United States Patent
Bohnacker

(10) Patent No.: US 10,934,138 B2
(45) Date of Patent: Mar. 2, 2021

(54) CRAWLER CRANE

(71) Applicant: Liebherr-Werk Ehingen GmbH, Ehingen (DE)

(72) Inventor: Roland Bohnacker, Blaubeuren (DE)

(73) Assignee: LIEBHERR-WERK EHINGEN GMBH, Ehingen (DE)

( * ) Notice: Subject to any disclaimer, the term of this patent is extended or adjusted under 35 U.S.C. 154(b) by 95 days.

(21) Appl. No.: 16/057,678

(22) Filed: Aug. 7, 2018

(65) Prior Publication Data
US 2019/0039863 A1    Feb. 7, 2019

(30) Foreign Application Priority Data

Aug. 7, 2017    (DE) ..................... 20 2017 104 706.7

(51) Int. Cl.
| | | |
|---|---|---|
| *B66C 15/04* | (2006.01) | |
| *B66C 13/46* | (2006.01) | |
| *B66C 23/76* | (2006.01) | |
| *B60R 1/00* | (2006.01) | |
| *B66C 23/36* | (2006.01) | |
| *B66C 23/88* | (2006.01) | |

(52) U.S. Cl.
CPC ............... *B66C 15/04* (2013.01); *B60R 1/00* (2013.01); *B66C 13/46* (2013.01); *B66C 23/36* (2013.01); *B66C 23/76* (2013.01); *B66C 23/88* (2013.01); *B60R 2300/8093* (2013.01)

(58) Field of Classification Search
CPC ......... B66C 15/04; B66C 23/36; B66C 23/88; B66C 13/46; B66C 23/76; B60R 1/00; B60R 2300/8093
See application file for complete search history.

(56) References Cited

U.S. PATENT DOCUMENTS

| | | | |
|---|---|---|---|
| 2005/0232733 A1* | 10/2005 | Maurer ................. | B66C 13/085 414/334 |
| 2015/0249821 A1* | 9/2015 | Tanizumi ................ | B66C 13/00 348/46 |
| 2017/0015533 A1* | 1/2017 | Iwazawa ................. | B66C 23/74 |
| 2018/0141788 A1* | 5/2018 | Rudy ...................... | B66C 15/06 |

FOREIGN PATENT DOCUMENTS

| | | | | |
|---|---|---|---|---|
| DE | 19931302 A1 | | 1/2001 | |
| DE | 102011015881 A1 | * | 10/2012 | ............. B66C 23/64 |
| DE | 102013012019 A1 | | 1/2015 | |
| DE | 102014018063 A1 | | 6/2016 | |
| EP | 2135834 A1 | * | 12/2009 | ............. B66C 13/46 |
| EP | 3000761 A1 | | 3/2016 | |
| JP | 2001171981 A | | 6/2001 | |
| WO | 2014046213 A1 | | 3/2014 | |

* cited by examiner

*Primary Examiner* — Aniss Chad
*Assistant Examiner* — Chase L Cooley
(74) *Attorney, Agent, or Firm* — McCoy Russell LLP

(57) ABSTRACT

The present disclosure relates to a crawler crane comprising at least one camera system, wherein the camera system is adapted to detect data relating to the relative position of the crawler crane to a suspended ballast and/or to at least one travelable ballast wagon.

12 Claims, 2 Drawing Sheets

CRAWLER CRANE

CROSS REFERENCE TO RELATED APPLICATION

This application claims priority to German Utility Model Application No. 20 2017 104 706.7, entitled "Crawler Crane," filed Aug. 7, 2017, the entire contents of which is hereby incorporated by reference in its entirety for all purposes.

BACKGROUND

The present disclosure relates to a crawler crane having at least one camera system, wherein the camera system is adapted to detect data relating to the relative position of the crawler crane to a suspended ballast and/or to at least one ballast wagon, and having at least one control/regulator that is adapted to initiate or to end a movement of the crawler crane and/or of the ballast wagon on the basis of the detected data.

TECHNICAL FIELD

Crawler cranes are known from conventional art in which a ballast wagon is connected to the superstructure of the crawler crane via a connection element. A suspended ballast of the crawler crane can be placed on the ballast wagon as required. The ballast wagon is rotated or moved along by the crawler crane via the connection element. It is disadvantageous in this process that such connection elements cannot be designed sufficiently strong for large ballast weights and the ballast wagon can thereby no longer be rotated by the crawler crane with large ballast weights and then has to be equipped with its own drive as necessary.

Cranes are also known from the conventional art in which at least one camera is provided, for example at the tip of a boom, wherein setup conditions of the crane can, for example, be detected by means of the camera and/or the working range of the crane can be monitored. Crane systems are also known in which a crane monitoring takes place by means of a crane attached to a drone.

Ballast wagons are furthermore known that use at least one self-propelled modular transporter (SPMT) vehicle as a base body.

It is the object of the present disclosure to further develop crawler cranes of the category such that they can take along ballast wagons that are not coupled to the crane via a connection element. In accordance with the present disclosure, correspondingly higher ballast weights should here be able to be traveled or moved by the ballast wagons.

This object is achieved by a crawler crane having at least one camera system, wherein the camera system is adapted to detect data relating to the relative position of the crawler crane to a suspended ballast and/or to at least one ballast wagon.

The corresponding relative position can be recorded by the camera and can, for example, be displayed to the user with warning limits or intervention limits on a screen. The operator can then manually travel the ballast wagon with reference to the display. The operator can carry this out, for example, by means of a remote control or at an installed control station.

In an embodiment, however, at least one control/regulator can additionally be provided that is adapted to initiate or to end a movement of the crawler crane and/or of the ballast wagon on the basis of the detected data.

A rigid connection between the crawler crane and the ballast wagon is thus superfluous in accordance with the present disclosure and thus also does not have to be provided. It can rather be replaced with a sensor system that is able to recognize or to detect the current position of the ballast or of a transport system used as a ballast wagon and to maintain it within predefined limits, monitored by a control unit or by a control/regulator. More than one ballast wagon can also be detected in accordance with the present disclosure by the camera system and/or can be controlled/regulated by the control/regulator. In an embodiment, the control/regulator can be implemented as an onboard computer of the crawler crane and/or can comprise all the devices required for the control/regulation such as a memory, input means, output means and/or a processor.

In an embodiment a camera system is arranged in the upper region, such as in the head piece of a derrick boom of the crawler crane. It is hereby possible to monitor the region beneath the derrick boom in which the ballast and/or the ballast wagon is/are arranged in a simple manner.

It is conceivable in a further embodiment of the present disclosure that at least one respective marker, or exactly two markers, is/are arranged at the crawler crane, at the suspended ballast and/or at the ballast wagon. The markers can be configured to be detected by the camera system. The markers and thus the components coupled to the markers can hereby be simply detected. The camera system can itself consist of or comprise more than one camera and such as a stereo camera. Distances or positions of the detected objects can hereby be determined more exactly. The vertical position of the markers are taken into account in this determination.

It is conceivable in an embodiment that the at least one marker is adapted to generate at least one interval signal. The marker can accordingly be an active marker that is also easily recognizable by the camera system under adverse environmental conditions.

It is conceivable in an embodiment that the at least one marker is adapted to output light signals by means of which it can be identified. In this respect, different marks can output different light signals that can be detected by the camera system and that can be correspondingly evaluated by the control/regulator. Position recognition points can be formed by the light markers so that operation is also possible at night or in fog.

The signal can also have a non-visible wavelength.

It is conceivable in an embodiment that exactly two markers or more than two markers are arranged at the crawler crane and/or at the suspended ballast and/or at the ballast wagon. In one embodiment the markers are arranged at the crawler crane are arranged symmetrically to the crane axis of the crawler crane and/or to positions defined with respect to the axis of rotation of the crawler crane.

It is possible by the use of two markers that can be arranged at exactly defined intervals from one another or at defined positions relative to the crawler crane, to the ballast and/or to the ballast wagon to use the distance between the markers to check the measurement accuracy of the camera system by means of the camera system. If the markers are furthermore positioned with respect, for example, to the rotation center of a slewing platform or of a superstructure 11 of the crawler crane and/or are arranged at defined positions at the crawler crane, at the ballast wagon and/or at the suspended ballast, the positions of the correspondingly marked components can be detected with reference to the positions of the markers and can be used to control/regulate the components or their movement. The safety level can be increased by the use of two or more markers per component.

It is conceivable in an embodiment of the present disclosure that the spacing of two markers is stored in the control/regulator and can be compared by the control/regulator with the data detected by means of the camera system for determining a measurement error.

The present disclosure is furthermore directed to a system comprising a crawler crane and a ballast wagon. The ballast wagon and the crawler crane can here comprise corresponding markers. The present disclosure further relates to a ballast wagon having at least one marker. The system and the ballast wagon can comprise further features such as result from the description of the crawler crane. A repetition is dispensed with in this respect.

The present disclosure is furthermore directed to a method for operating a crawler crane, wherein in one step the relative position of the crawler crane to a suspended ballast of the crawler crane and/or to a ballast wagon is determined by means of the camera system and the control/regulator and in a further step a movement of the crawler crane and/or of the ballast wagon is initiated or ended on the basis of the relative position. The method can comprise further features that correspond to the apparatus features described here and whose repetition is therefore dispensed with.

Further details and advantages of the present disclosure are explained with reference to the embodiments shown by way of example in the Figures.

DETAILED DESCRIPTION

Figure 1:
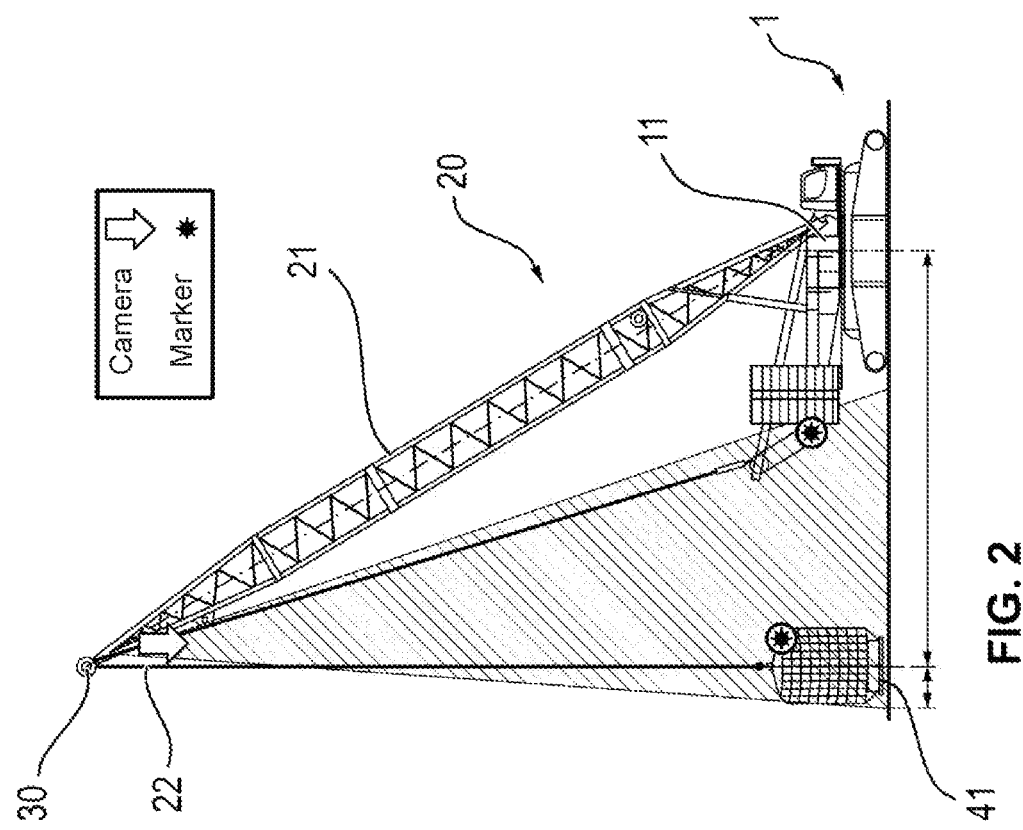
FIGS. 1 and 2 show schematic representations of a crawler crane in accordance with the present disclosure with an angular window detected by the camera system.
Figure 2:
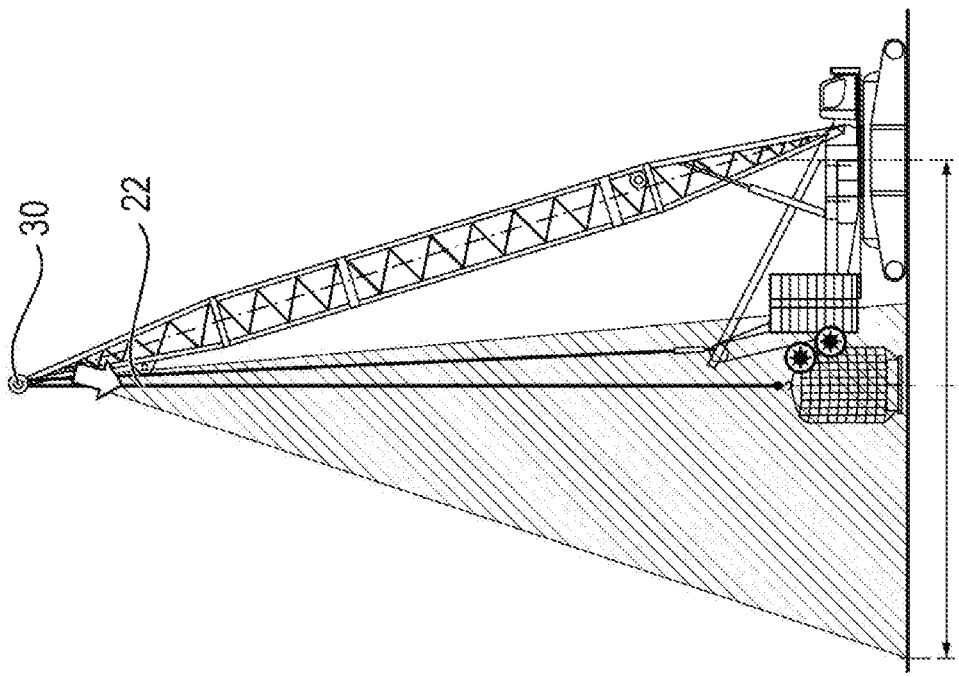

FIGS. 1 and 2 are side views of a crawler crane 1 in accordance with the present disclosure having a camera system 30 provided in the upper region of a derrick boom. The camera system 30 is adapted to detect data on the relative position of the crawler crane 1 to a suspended ballast and/or to a ballast wagon 40. The suspended ballast can be arranged on a suspended ballast pallet 41. The crawler crane 1 can comprise a superstructure 11 or a slewing platform rotatably supported on an undercarriage. The crawler crane 1 comprises at least one control/regulator that is adapted to initiate or to end a movement of the crawler crane 1 and/or of the ballast wagon 40 on the basis of the detected data. The movement can be a rotational movement of the superstructure 11 about the undercarriage.

The camera system 30 is adapted to detect the relative position of the crawler crane 1 to the suspended ballast and/or to the ballast wagon 40, wherein the actual position of said components is determined. A desired position can be stored in the control/regulator and the control/regulator can control the crawler crane 1 and/or the ballast wagon 40 to minimize the difference between the desired position and the actual position.

The camera system 30 can be attached to the boom system 20, such as to the tip of the derrick boom 21. Using the camera system, a mechanical connection between the crawler crane 1 and the ballast wagon 40 can be dispensed with. This alleviates the problem of large forces occurring with large ballast weights no longer being able to be received by the steel construction of a corresponding connection.

Figure 3:
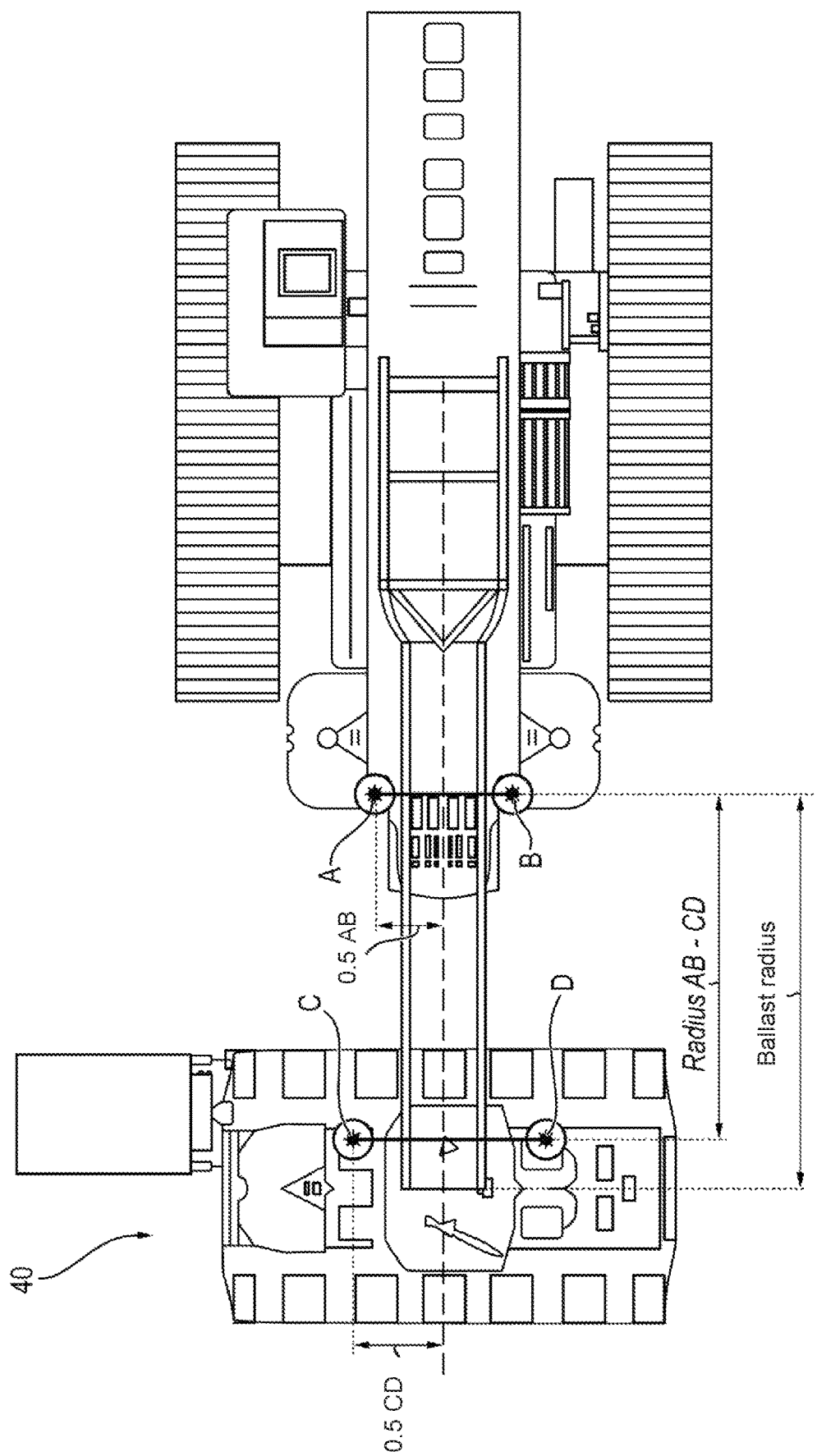
FIG. 3 shows a plan view of a crawler crane in accordance with the present disclosure with a schematic representation of the positions of the markers.

As can be seen from FIG. 3, in particular active markers A and B can be attached to the crawler crane 1. Active markers C and D can likewise be attached to the ballast wagon 40 and/or to the ballast weight. The markers can be lamps that output signals at a defined interval. This helps to prevent that a marker is confused with a reflection or similar. A "frozen" image in which no interval signals can be detected can also, for example, be determined quickly after a computer crash.

A receiver or the camera system 30 and the control/regulator can thus determine which marker can be seen at this point. The camera system 30 is directed in the direction of the crawler crane 1 and the ballast wagon 40. It can record the signals of the markers such as A, B, C, and D. The control/regulation of the paths of the crawler crane 1 and of the ballast wagon 40 can take place using the markers.

The regulation can, for example, take place with reference to a circle (cf. FIG. 2) around the respective marker. To confirm the measurement accuracy, a comparison can be made between the geometrically known spacing or the spacing provided to the control/regulation of the respective marker pairs A and B and C and D. If this is within required limits, the measurement accuracy is deemed confirmed.

It is also conceivable that a kind of "zeroing" takes place after the setting up and after the verification of the measurement accuracy. Starting from this state, the regulation then takes place to track the ballast wagon or a self-propelled modular transporter (SPMT).

The present disclosure can also be performed without markers. A camera system 30 can be used for this purpose that is able to recognize contours. The SPMT and the ballast located thereon would thus be reliably recognized.

The calculation of a ballast radius can then take place from the geometrically known spacing of the markers A and B from the slewing ring center of the superstructure 11 and from the geometrically known spacing of the markers C and D from the center of gravity of the ballast wagon 40 and the determined spacing of the distances AB and CD.

The ballast wagon 40 therefore does not have to a bought-in standard SPMT. It can equally be manufactured as a separate component. The control/regulation can hereby be able to be integrated more easily into the crane's own control. An SPMT could then also have a certain smaller rated capacity. With more ballast to be supported, a plurality of wagons would be connected together and form a reception surface for the suspended ballast pallet 41.

The environmental recognition on the construction site by means of the camera system is conceivable as an additional useful possibility. Obstacles, persons, limits of the firm surfaced ground, and other things can thus be detected and can be presented on a monitor for the crane operator.

Distance measurements via sensors are furthermore conceivable as further diverse monitoring processes. These sensors can be length encoders or position sensors (e.g. GPS). Distances and/or positions of said components can be determined by means of the sensors.

The position recognition by means of a camera is possible with an unambiguous contour (recognition point). The error is approximately linear with respect to the distance. This possible operating region within whose limits the operator of the SPMT may move it could be used for an assistance system.

To be able to determine the position of the ballast wagon, a plurality of suitable points at the ballast, at the ballast wagon, at the slewing platform and/or at the superstructure 11 of the crane can be detected by means of the camera system at the head of the derrick boom 21.

The ballast wagon 40 can be formed by one or more self-propelled transport vehicles that always have to be located vertically below the connector points of the ballast guying at the derrick boom for receiving the suspended ballast pallet.

The operation can be monitored and optionally stopped by means of the detected data by a control unit or by a control/regulation. It is additionally possible to control either the SPMT as a master and the crawler crane 1 as a slave or vice versa wherein the crane is the master and the SPMT is the slave for common operation and to monitor them in operation.

In the position determination by means of a camera system 30 in the head region of the derrick counter-boom 21, an additional environmental recognition is possible that can also recognize the substructure (roadway) and possible obstacles.

In one embodiment, the safety concept provides that the operation of the crawler crane 1 is only permitted when all the predefined markers A, B, C, D are recognized by the system. For this purpose, the markers can transmit corresponding light signals that can be associated with the respective position.

The crane axis can be determined as normal to the distance AB with respect to its center from the two markers at the slewing platform of the crawler crane A and B.

The measurement error is determined and can be checked by the measured error between the markers AB and CD.

A position for the markers C and D of the ballast pallet or of the SPMT is determined from the normal to the distance AB and the measured/determined ballast radius. This position describes a circle having a radius R in whose area the optically measured positions of the light signal C and of the light signal D have to be located.

The radius range can be presented on a monitoring display so that the operator of the SPMT can recognize the current position on the display. If a defined radius range or distance from the center is reached, an indication as to the direction in which the SPMT is to be steered can be displayed in graphical form. If the radius range reaches a further defined range or distance from the center point, an additional acoustic warning signal can be output.

In an embodiment, the only permitted movement of the SPMT in a mode of operation of the crawler crane 1 having derrick ballast on a ballast wagon can be the rotation about the axis of rotation of the slewing roller connection of the crawler crane 1. The rotational center for the alignment of the wheelsets required for the movement can be determined by the crane control or by the control/regulation and can either be output to the operator of the SPMT via a display or can be directly transmitted via an interface of the control of the SPMT.

An interface between the control units of the crawler crane and the SPMT is conceivable that, on an emergency stop of a control unit, performs an immediate emergency stop of the other control unit.

In the embodiment, the apparatus can be adapted to permit a traveling of the crawler crane on a crawler with load only with a suspended ballast. The SPMT can be tracked by the crane separately. In this respect, no monitoring of the SPMT or of its position is required.

The apparatus can furthermore be adapted to permit a traveling of the crawler crane on a crawler without load when the suspended ballast frame of the crawler crane is braced at a provided point and the crawler crane is traveled without a suspended ballast. The SPMT with ballast pallet and ballast can be traveled separately from the crawler crane. At the next deployment site, the crawler crane can be very quickly be put back in operation with the counterweight. No monitoring of the SPMT or of the ballast pallet takes place in operation without a derrick ballast.

In the embodiment, provision can be made that the markers A, B, C, D attached to the slewing platform can be identified by means of light indications and that operation is only released when both or all the light signals can be associated. The light indications can be a Morse code, for example.

The two markers C, D attached to the suspended ballast pallet 41 are correspondingly to be identified by means of light indication and operation is to be released when both or all light signals can be associated.

The spacing of the two light signals at the slewing platform and at the suspended ballast pallets 41 can be measured and can be checked with the predefined value in the control unit. Operation is not possible on a deviation over a defined error tolerance. An error message can be output by the control/regulator here.

The measurement inaccuracy of the coordinates occurring due to the deformation of the slewing platform is of no significance on the occurring deflection in the horizontal direction.

If both markers of a component cannot be unambiguously recognized or associated, the system switches to stop or emergency stop.

If the marker D or C at the ballast wagon 40 is within the permitted radius range, operation is permitted.

In the position determination by means of a camera in the head region of the derrick boom, it is possible by the additional environmental recognition also to warn the operating personnel by means of an acoustic warning signal of damage in the subsurface (roadway) and of any obstacles in the rotating range.

The monitoring of the markers is dispensed with on selection of the mode of operation with or without suspended ballast, that is, without a ballast wagon.

The indication on a display nevertheless has to be carried out for position work. The monitoring and warning functions correspond to those of standard operations, SD operation with a heavy main boom and a derrick boom, and SDB operation with an additional derrick ballast, that is suspended and so without a ballast wagon. The ballast stands on the ground here with a non-loaded crawler crane.

An embodiment is conceivable in which deviations between the desired position and the actual position can be presented optically in the camera image. An automatic live monitoring is furthermore conceivable in which, for example, flashing LEDs or similar are provided at the ballast and/or at the derrick boom 21. A verification with a vehicle movement (motion vector) and a redundant sensor system (cable winches or similar) are furthermore conceivable.

An installation of a radar sensor at the superstructure 11 with a view of the ballast weight and at the ballast weight with a corresponding power supply is also conceivable. This radar sensor can be used additionally or alternatively to the camera system 30. Distances and angular positions can be determined with the aid of the radar sensor. A "zeroing" of the apparatus can likewise take place by the operator on an optimum position of the ballast or of the ballast wagon 40 relative to the crawler crane 1.

The invention claimed is:

1. A system of a crawler crane and ballast wagon, comprising:
   the ballast wagon being self-propelled and detached from the crawler crane,
   at least one camera system, wherein the at least one camera system is configured to detect data of a distance between the crawler crane and the ballast wagon along the ground, and
   at least one control or regulator configured to initiate or end movement of the crawler crane and propel the ballast wagon to minimize a difference between a target distance between the crawler crane and the ballast wagon and the detected distance between the crawler crane and the ballast wagon.

2. The crawler crane in accordance with claim 1, wherein the at least one camera system is arranged in an upper region of a derrick boom of the crawler crane.

3. The crawler crane in accordance with claim 1, wherein a respective at least one marker is arranged at one or more of the crawler crane, the suspended ballast, and the ballast wagon and is configured to generate at least one interval signal.

4. The crawler crane in accordance with claim 3, wherein the at least one marker is configured to output light signals by means of which it can be identified.

5. The crawler crane in accordance with claim 3, wherein two markers are arranged at one or more of the crawler crane, the suspended ballast, and the ballast wagon, with the two markers arranged at the crawler crane being arranged at a position defined with respect to an axis of rotation of the crawler crane.

6. The crawler crane in accordance with claim 5, wherein spacing of the two markers is stored in the control/regulator and is compared with the data detected by the at least one camera system by the control/regulator to determine an error case.

7. A system comprising the crawler crane in accordance with claim 1, and at least one additional ballast wagon.

8. The system of claim 7, wherein the ballast wagon comprises at least one marker.

9. A method of operating a crawler crane,
   the crawler crane comprising at least one camera system,
   detecting data of a position of the crawler crane relative to self-propelled ballast wagon separate from the crawler crane,
   determining a distance between the crawler crane and the ballast wagon using the camera system, and
   moving the crawler crane and propelling the ballast wagon, the movement initiated or ended by a controller to minimize a difference between a target relative distance between the crawler crane and the ballast wagon along the ground and the determined relative distance between the crawler crane to the ballast wagon.

10. A method of operating a crawler crane:
    the crawler crane comprising at least one camera system,
    detecting a distance between the crawler crane and the self-propelled ballast wagon along the ground with the at least one camera system, wherein the ballast wagon is separate from the crawler crane, and
    propelling the travelable ballast wagon on a basis of the detected distance between the crawler crane and the ballast wagon.

11. The method of claim 10, wherein the at least one camera system is arranged in a head piece of a derrick boom of the crawler crane.

12. The method of claim 10, wherein two markers are arranged at one or more of the crawler crane, the suspended ballast, and the ballast wagon, with the two markers being arranged at the crawler crane symmetrical to a crane axis of the crawler crane and at a position defined with respect to an axis of rotation of the crawler crane.

* * * * *